Aug. 22, 1961  S. A. SCHERBATSKOY  2,997,586
GAMMA RAY TESTING
Filed Aug. 16, 1955  4 Sheets-Sheet 1

INVENTOR.
Serge A Scherbatskoy

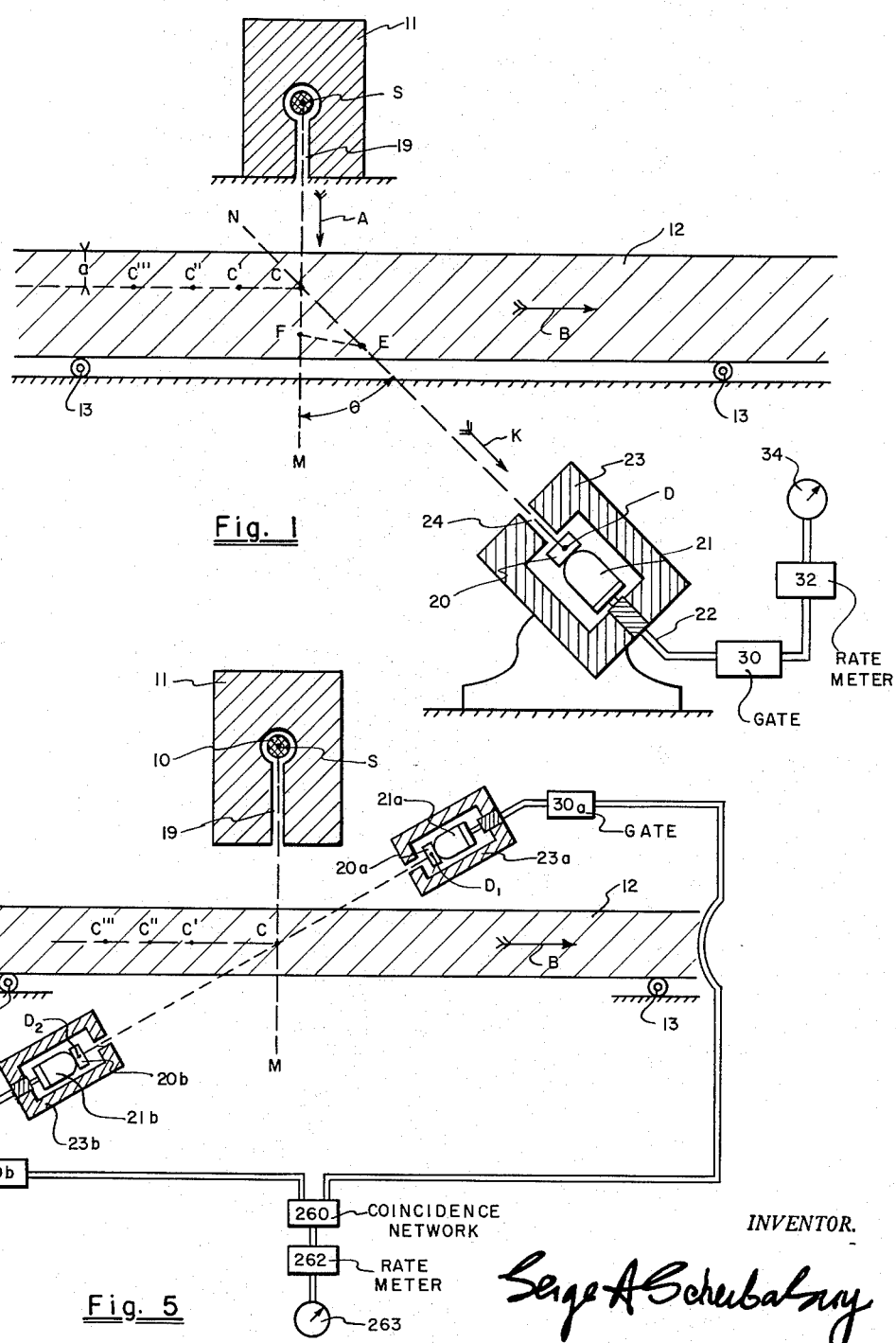

United States Patent Office 2,997,586
Patented Aug. 22, 1961

2,997,586
GAMMA RAY TESTING
Serge A. Scherbatskoy, 804 Wright Bldg., Tulsa 3, Okla.
Filed Aug. 16, 1955, Ser. No. 528,675
7 Claims. (Cl. 250—71.5)

This invention relates to methods and apparatus for determining the characteristics of an unknown substance by irradiating said substance with gamma rays and measuring the ability of said substance to respond to said radiation.

The primary object of my invention is to provide a means and a method for accurately determining the density at any remote point of an unknown medium without any necessity for obtaining access to said point.

It is another object of my invention to accurately determine the structural composition of an unknown object.

Further objects of my invention will be apparent from the following description taken in connection with the accompanying drawings in which:

FIGS. 1 and 1a show an arrangement comprising a fixed directional gamma ray detector provided with a single channel amplitude discriminator.

FIG. 5 shows a testing arrangement utilizing the process of pair formations.

Figure 1A:
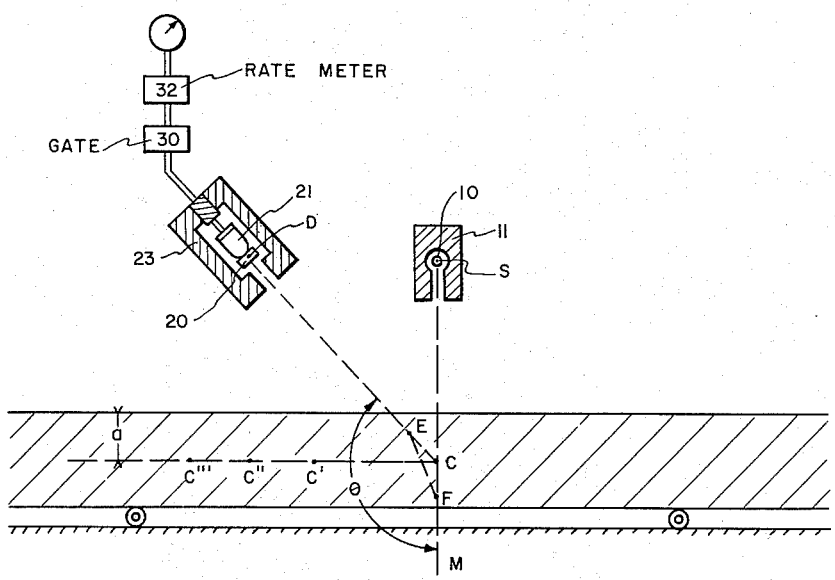

In accordance with this invention, a device is provided containing a source of radiation. The source is placed in a block of shielding material which absorbs all radiations except those directed along a narrow beam towards the medium to be investigated. Another device is provided which is adapted to detect radiations which have been scattered by a predetermined limited region within said medium. Only a portion of said scattered radiation is measured, said portion comprising a beam displaced with respect to the incident beam by a predetermined angle, and containing only those gamma rays that have energies determined by the relationship that expresses the Compton scattering. The detecting device is preferably connected to a suitable instrument which can indicate directly the density of said limited region.

Referring now more particularly to FIG. 1, the point S designates a radiation source emitting a substantially monochromatic beam of gamma rays such as, for instance, $K^{42}$ emitting gamma rays having 1.51 mev. or $Os^{193}$ emitting gamma rays of 1.2 mev. or $Zn^{65}$ emitting gamma rays of 1.11 mev. or $Co^{60}$ emitting gamma rays of about 1.2 mev. More particularly, the emitted photons of $Co^{60}$ have the energy values 1.17 mev. and 1.33 mev. However, for practical purposes it may be assumed that the radiations emitted by $Co^{60}$ are monochromatic. To illustrate my invention, I have chosen $Co^{60}$ as an example of the source S. This source is placed in a block 11 of a material such as lead or tungsten which will strongly absorb all emitted rays except those passing through a narrow elongated hole 19 in the direction of the arrow A. The collimated beam of gamma rays emitted in the direction of the arrow A penetrates an elongated metal strip 12 which it is desired to test as said strip glides on the rolls 13 in the direction of the arrow B.

Consider now the collimated beam of photons transmitted downwards towards the strip 12. As this beam traverses the strip a number of photons are gradually scattered from the original beam and therefore the number of photons that remains in the beam gradually decreases. Let $I_0$ designate the number of photons in the beam incident on the strip 12, $I_1$ the intensity of the beam that remained unscattered after traversing a thickness $d$ of the metal strip and let $\mu$ designate the total absorption and scattering coefficient of the strip 12. We have therefore $$I_1 = I_0 e^{-\mu d} \tag{1}$$

Since the incident beam $I_0$ is substantially monochromatic, i.e. each photon has the energy 1.2 mev., the unscattered beam $I_1$ that has traversed the thickness $d$ is also monochromatic at the same energy 1.2 mev.

As the incident beam traverses the strip 12, it undergoes not only absorption but also scattering in all directions. FIG. 1 shows an arrangement for detecting and measuring a portion of said scattered gamma rays, and namely, a portion directed along the arrow K. This arrangement comprises a crystal 20 which may be of anthracene, sodium iodide, or of any other substance adapted to produce light as a result of interaction with the incident gamma rays. The crystal is located at the point D and is preferably of sufficient size so as to absorb completely the incident photons. Therefore, the intensity of the light impulses emitted by the crystal is proportional to the energy of the absorbed photons. The crystal 20 cooperates with the photomultiplier 21 in a manner well known in the art so as to produce across the output terminals 22 of the photomultiplier current pulses that are proportional to the corresponding light pulses. Both the crystal 20 and the photomultiplier 21 are completely surrounded by a thick shield 23 except for a narrow elongated opening 24 aligned along the direction of the arrow K. Thus the shield is effective in absorbing all gamma rays except those arriving along the direction of the arrow K. It is thus apparent that the directional gamma ray detector is selectively responsive only to those photons that are aligned along the direction K, and it produces across its output leads 22 a succession of impulses having magnitudes representing the energies of the corresponding photons.

The impulses appearing at the output of the photomultiplier 21 are applied to a gate 30. The gate is essentially an amplitude discriminating network that is adapted to transmit selectively only those impulses that are comprised within a certain predetermined, relatively narrow range of magnitudes that correspond to a determined value $E_\gamma'$ of the incident photons. The impulses outside of said range of magnitudes are attenuated by the gate 30. The impulses transmitted by the gate 30 are applied to a rate meter 32, which is adapted to produce across its output terminals a D.C. voltage representing the frequency of the impulses appearing at the output of the gate 30. The rate meter 32 is in turn connected to an indicator 34 which shows the frequency of occurrence of photons having a determined energy $E_\gamma'$ and incident on the crystal 20.

Consider again the beam of incident photons emitted by the source 10 and directed along the arrow A along the trajectory SM into the slab 12. As the beam traverses the absorber it undergoes numerous Compton collisions as a result of which it becomes partially degraded in energy and spreads over a wide angle of scattering. Thus the slab 12 becomes itself a source of scattered gamma rays, said scattered gamma rays being degraded in energy and emitted in all directions. In the arrangement of FIG. 1 we are particularly interested in those scattered photons that are directed along the arrow K (along the trajectory CD) and are detected by the crystal 20. These photons can be subdivided into two groups designated as (a) and (b). The group (a) comprises those photons that result from a single scattering within the slab 12, said scattering taking place at the point C on the intersection of the lines SM and DN. Thus the photons participating in the single scattering follow the trajectory SCD. The group (b) includes those photons that result from a multiple scattering within the slab 12. For instance, one of the photons participating in a multiple scattering follows the trajectory SFED and undergoes scattering at the points F and E.

We shall now consider the photons of the group (a). These photons result from the scattering at the point C. The incident energy of photons emitted by the source 10 is 1.2 mev. and the angle of scattering ∢MCD is designated as $\theta$. It is apparent that all photons scattered in the direction $\theta$ have the same energy $E_\gamma'$ which can be determined as a function of the incident energy $E_\gamma$ and the angle of scattering $\theta$ by means of a well known relationship due to Compton.

$$E_\gamma' = \frac{E_\gamma}{[(1 + E_\gamma/mc^2)(1 - \cos\theta)]} \quad (2)$$

where $mc^2 = 0.511$ mev. is the rest energy of the electron.

In the present case the energy of photons incident along the direction of the arrow A is $E_\gamma = 1.2$ mev. and the angle of scattering is $\theta = \angle MCD = 45°$. Substituting these two values in the Equation 2 we obtain that the energy of the scattered photons belonging to the group (a) is $E_\gamma^1 = 0.7$ mev.

Furthermore, it is well known that the number of electrons scattered in the direction $\theta$ per second and contained within the solid angle $d\Omega$ which we shall designate as $N_{incident}d\Omega$ is proportional to the density $n$ of electrons in the neighborhood of the scattering point C. This relationship can be expressed as follows:

$$N_{scattered} = N_{incident} \times n \times \sigma(E_\gamma, \theta) \quad (3)$$

where $N_{incident}$ is the number of incident photons emitted by the source 10 in the direction of the arrow A and the expression $\sigma(E_\gamma, \theta)$ is known for any values of $E_\gamma$ and $\theta$ (in our case $E_\gamma = 1.12$ mev. and $\theta = 45°$). The values of $\sigma(E_\gamma, \theta)$ have been plotted for various values of $E_\gamma$ and $\theta$ in the National Bureau of Standards Circular 542 issued Aug. 28, 1953 on Graphs of the Compton Energy-Angle Relationship and the Klein Nishina Formula from 10 kev. to 500 mev. by Ann T. Nelms.

It is of importance to note that the value $n$ in the Formula 3 expressing the number of electrons per cm.³ in the neighborhood of the point C also represents the density of matter in the very small portion of the slab in the immediate neighborhood of the point C. Consequently, we can reach the important conclusion that the number of photons scattered per second at the point C in the direction of the arrow K is proportional to the density of matter at the point C. Thus the number of photons per second within the group (a) could be used as a measure of the density of the material at the point C.

However, not all the photons scattered in the direction K along the line CD belong to the group (a) since many of these photons undergo a multiple scattering and therefore belong to the group (b). Our problem consists in selectively receiving the scattered photons of the group (a) since only these photons carry useful information. We should therefore eliminate from the reception the scattered photons of the group (b) since they interfere and mask the useful information. The separation of the two groups can be effected since the photons of the group (a) differ in energy from the photons of the group (b). As stated above, all the photons of the group (a) have energy $E_\gamma' = 0.7$ mev. obtained from the Expression 2. However, the energy of the photons resulting from multiple scattering differs considerably from 0.7 mev. In the case of multiple scattering the trajectory of each photon has to be considered separately. Thus referring to the example shown in FIG. 1 it is seen that the incident photon undergoes a first scattering at the point F and the energy $E_\gamma''$ of the scattered photon can be obtained by substituting $E_\gamma = 1.12$ mev. and $\theta'' = \angle MFE$ in the Expression 2, thus yielding $E_\gamma'' = 0.42$ mev. Consequently, at the first scattering the energy of the photon has been degraded from the value $E_\gamma = 1.2$ mev. to the value $E_\gamma'' = 0.42$ mev. The second scattering takes place at the point E at which the photon having an initial energy $E_\gamma'' = 0.42$ mev. was further degraded to a new value $E_\gamma''' = 0.29$ mev. It should be noted that the final energy of the photon after two scattering collisions at the points F and E is lower than the final energy of the photon after a single scattering at the point C.

It should be noted that the energy $E_\gamma' = 0.7$ mev. is characteristic of the path SCD in which a single scattering takes place at the point C and therefore if a photon having energy $E_\gamma' = 0.7$ mev. arrives at the crystal 20 along a path ND, it is known that this photon is the secondary scattered photon originated at the point C at which the scattering took place. Therefore, the number of photons having energy $E_\gamma' = 0.7$ mev. arriving at the crystal 20 along the line CD is proportional to the number of electrons per cm.³ in the region of the point C. It should be also noted that a number of scattered electrons that arrive at the crystal 20 along the path ND have an energy different from 0.7 mev. These electrons result from multiple scattering within the slab 12 and they do not carry any useful information.

Consequently our problem consists in separating the incident photons having energies substantially equal to 0.7 mev. from all other incident photons. This is accomplished by means of the gate 30 which selectively transmits only the impulses within a relatively narrow range representing the photons having energy 0.7 mev. These impulses are transmitted through the rate meter 32 to the indicator 34. The value shown on the indicator 34 represents the rate of occurrence of photons of energy 0.7 mev.

It is thus apparent that the indication of the meter 34 represents the electron density at the point C. The latter is proportional to the specific density of the material at the point C, and therefore I have provided a method of measuring the density within the slab 12 at a point C which is not accessible to direct observation. As a slab 12 rolls in the direction of the arrow B, various points such as C′, C″, C‴, etc. are brought into the same position as the point C and the meter 34 indicates successively the density of the material at said points. It is noted that all these points are located on a line at a distance "a" from the surface of the slab and therefore my method makes it possible to determine any structural inhomogeneity of the slab along the profile determined by said line.

In the arrangement of FIG. 1 the source 10 is located on one side of the moving slab 12 and the detector is located on the opposite of the slab. Because of this geometry, the scattering angle MCD is smaller than 90 degrees. It is, however, apparent that we may place both the source of radiation and the detector on the same side of the moving slab as shown in FIG. 1a in which the scattering angle MCD is larger than 90 degrees.

It should be noted with reference to FIG. 1 or to FIG. 1a that if we use a monochromatic source such as Co⁶⁰ emitting gamma rays of 1.2 mev. the energy of gamma rays that result from single scattering is higher than the energy of incident gamma rays having the same direction but resulting from multiple scattering. Thus, for instance, the energy of photons impinging on the detector 20 that result from the "single scattering path" SCD is higher than the energy of the photons impinging on the detector 20 that result from the "multiple scattering path" SFED. Consequently, even if the energy of gamma rays emitted by the source S is unknown, we can select those gamma rays that underwent single scattering from other gamma rays since we do know that the "single scattering" gamma rays have a higher energy than the other gamma rays. Thus our selection can be made by passing through the gate 30 only those impulses that are within the upper range of magnitude since we do know that these impulses correspond to the gamma rays that underwent single scattering.

The above property is important since it is not necessary to use for the source 10 a source of monochromatic gamma rays. We may use as a source 10 radium which emits a wide spectrum of gamma rays. The upper range of this spectrum comprises gamma rays having energy of 2.3 mev. In such case the gate 30 should be adapted to transmit only those impulses that represent the energy $E_\gamma'$ which can be determined from the Formula 2 by putting $\theta = \measuredangle MCD$ and by putting for $E_\gamma$ the maximum energy of the gamma ray beam emitted by the source 10. In the case of radium $E_\gamma = 2.3$ mev. it is apparent that the gate 30 will transmit a narrow range of amplitude comprising the highest amplitudes that appear across the terminals 22. Thus my method may utilize not monochromatic gamma ray sources, but gamma ray sources having any spectral distribution.

Figure 2:
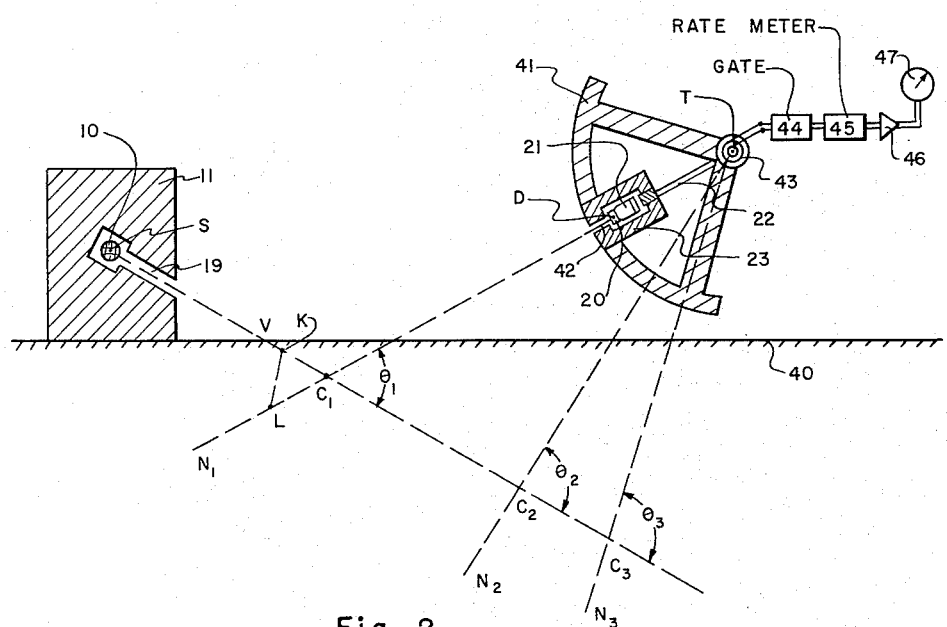
FIG. 2 shows an arrangement in which the orientation of the directional gamma ray receiver may be varied.

FIG. 2 shows an arrangement for exploration of the earth's substructure and is particularly adapted for the measurements of the soil density in situ at various depths below the earth's surface. The source of radiation 10 at the point S is shielded by a block of lead 11 provided with an elongated tubular opening 19 which allows a monochromatic beam of gamma rays to be projected into the ground along the trajectory SM. As the beam travels along said trajectory, it becomes gradually scattered in all directions. FIG. 2 illustrates as an example three scattered beams: The first beam was scattered at the point $C_1$ in the direct $\theta_1$ and is aligned along the trajectory $C_1T$. The second beam is scattered at the point $C_2$ in the direction $\theta_2$ and is aligned along the trajectory $C_2T$. The third beam is scattered at the point $C_3$ in the direction $\theta_3$ and is aligned along the trajectory $C_3T$. It is noted that all these three beams converge at the point T and the detecting system for receiving all scattered beams is located in the neighborhood of the point T. This arrangement comprises a segment having its center at the point T. On the periphery of the segment is fastened a directional radiation detector having its directional axis aligned along the radius of the segment. The directional detector is of the same type as the one shown in FIG. 1 and various elements of this detector have been designated in both figures by the same numerals. It comprises a crystal 20 (located at the point D) such as sodium iodide of sufficient size so as to absorb all incident photons, a photomultiplier 21, said crystal and photomultiplier being surrounded by a lead shield 23 except for an elongated tubular opening 42 aligned along the radial direction of the segment. The output leads 22 of the photomultiplier 21 are applied to a variable gate network 44. The network 44 is adapted to transmit impulses within a relatively narrow range of magnitudes which is fixed for a given fixed position of the segment 41. However, the network 44 is controllable and we can vary at will the range of magnitudes of impulses that are selectively transmitted. This range varies for each angular position of the segment 41, i.e. for each orientation of the directional gamma ray detector, but it remains stationary when said orientation is fixed.

In FIG. 2 the directional axis of the gamma ray detector is aligned along the trajectory $N_1D$ and therefore the crystal 20 is responsive to gamma rays that followed the trajectory $SC_1D$. These photons resulted from a scattering at the point $C_1$ at which the primary gamma ray energy $E_\gamma = 1.2$ mev. and the angle of scattering $\theta_1 = \measuredangle DC_1M$. Substituting these values for $E_\gamma$ and $\theta_1$ in the Expression 2 we obtain the value $(E_\gamma')_1$ of the photon scattered along the trajectory $C_1D$. The controllable gate 44 is so arranged as to transmit selectively only those impulses that represent the energy of $(E_\gamma')_1$ of the scattered photons.

It is apparent that the photons arriving at the crystal 20 along the trajectory $C_1D$ can be subdivided into two groups designated as (a) and (b). The group (a) comprises those photons that result from a single scattering at the point $C_1$ and have the energy $(E_\gamma')_1$ and the group (b) includes those photons that result from a multiple scattering, as for instance, the photon following the trajectory SKLD. It is noted that the photons incident on the crystal 20 that result from multiple scattering differ in energy from the photons that result from a single scattering at the point $C_1$. Thus the gate 44 acts like a filter that eliminates the impulses representing multiple scattering and transmits only those impulses that represent single scattering. These impulses are transmitted to the rate meter 45. Consequently the output voltage V of the rate meter represents the number $N_{scattered}d\Omega$ photons. The value $N_{scattered}$ can be represented as follows:

$$V = N_{\text{scattered}} = N^1_{\text{incident}} \times \sigma(E\gamma, \theta_1) \times n) \qquad (4)$$

where $N_{\text{incident}}$ is the primary photon flux incident on the point $C_1$, $\sigma(E_\gamma, \theta_1)$ is the scattering coefficient which for a given $E_\gamma$ is a function of $\theta$, (see above mentioned NBS Circular 542), and $n$ is the density of the material. Thus the output V of the frequency meter 45 shown on the indicator 46 represents the density of the substance at the point $C_1$, i.e.

$$V = Kn \qquad (5)$$

where the coefficient of proportionality K is a function of the value $\theta_1$, i.e.

$$K = N^1_{\text{incident}} \times \sigma(E_\gamma, \theta_1) \qquad (6)$$

It is noted that in the above equations $N^1_{\text{incident}}$ represents the number of photons incident at the point $C_1$. If we designate by $N_{\text{emitted}}$ the number of photons emitted by the source in the direction SM we obtain from (1)

$$N^1_{\text{incident}} = N_{\text{emitted}} \times e^{-\mu d} \qquad (7)$$

where $d$ is the distance traveled by the beam in the soil, i.e. $d = VC_1$ and $\mu$ is the absorption coefficient of soil. Substituting (7) in (6) we obtain for the coefficient of proportionality $$K = N_{\text{emitted}} \times e^{-\mu d}\sigma(E_\gamma, \theta_1) \qquad (8)$$

It is apparent that the coefficient of proportionality varies for each orientation of the directional gamma ray receiver.

The output of the rate network 45 is applied to an amplifier 46. The amplifier 46 has a controllable amplification factor which is controlled in accordance with the orientation of the directional gamma ray detector in such a manner that the amplification factor will always be expressed by the Formula 8, i.e. by the coefficient of proportionality K. It is thus apparent that the output of the amplifier 46 shown on the meter 47 will represent the density of the soil at the point $C_1$.

Assume now that the orientation of the directional receiver has been changed so as to receive the scattered radiation aligned along the direction $TN_2$. We change the settings of the gate 44 and of the amplifier 46 in accordance with this new orientation of the directional receiver. The setting of the gate 44 is changed so that it transmits selectively only those photons that have energy $(E_\gamma')_2$ which is given by the Expression 2 in which we put for the energy of the incident photon $E_\gamma = 1.2$ Mev. and for the angle of scattering $\theta$ the value $\theta_2 = \measuredangle TC_2M$. The setting of the amplifier 46 is made so as to obtain a new coefficient of amplification given by the Expression 8 in which, however, we set $d = d_2 = VC_2$ and instead of $\theta_1$ we put the new angle of scattering $\theta_2$. After these settings have been completed, we observe the indication of the meter 47. This indication represents then the density of soil at the point $C_2$.

In a similar manner when we can change the orientation of the directional gamma ray detector so as to receive photons aligned along the path $C_3T$, we make then the adjustment of the gate 44 corresponding to a new value $(E_\gamma')_3$ given by (2) in which $\theta_3 = \sphericalangle TC_3M$. Also we adjust the amplification of the amplifier 46 to a new value of K given by (8) in which $d=d_3=VC_3$ and $\theta=\theta_3$. Then the indication of the meter 47 will represent the density of the soil at the point $C_3$.

It is apparent that I provided a method and means for scanning the earth with a directional receiver so as to selectively receive gamma rays scattered at various points along the line SM such as the points $C_1$, $C_2$, $C_3$, etc. By making appropriate adjustments with the gate 44 and the amplifier 46 we may obtain an indication of the variation of the soil density along the profile given by the line SM.

Figure 3A:
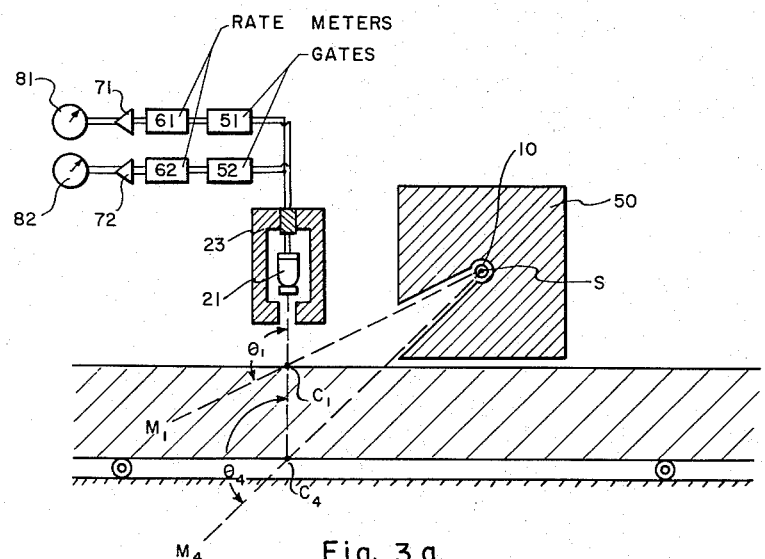
FIGS. 3 and 3a show an arrangement for transmission of gamma rays through a slab in which the directional receiver is provided with several amplitude discriminators.
Figure 3:
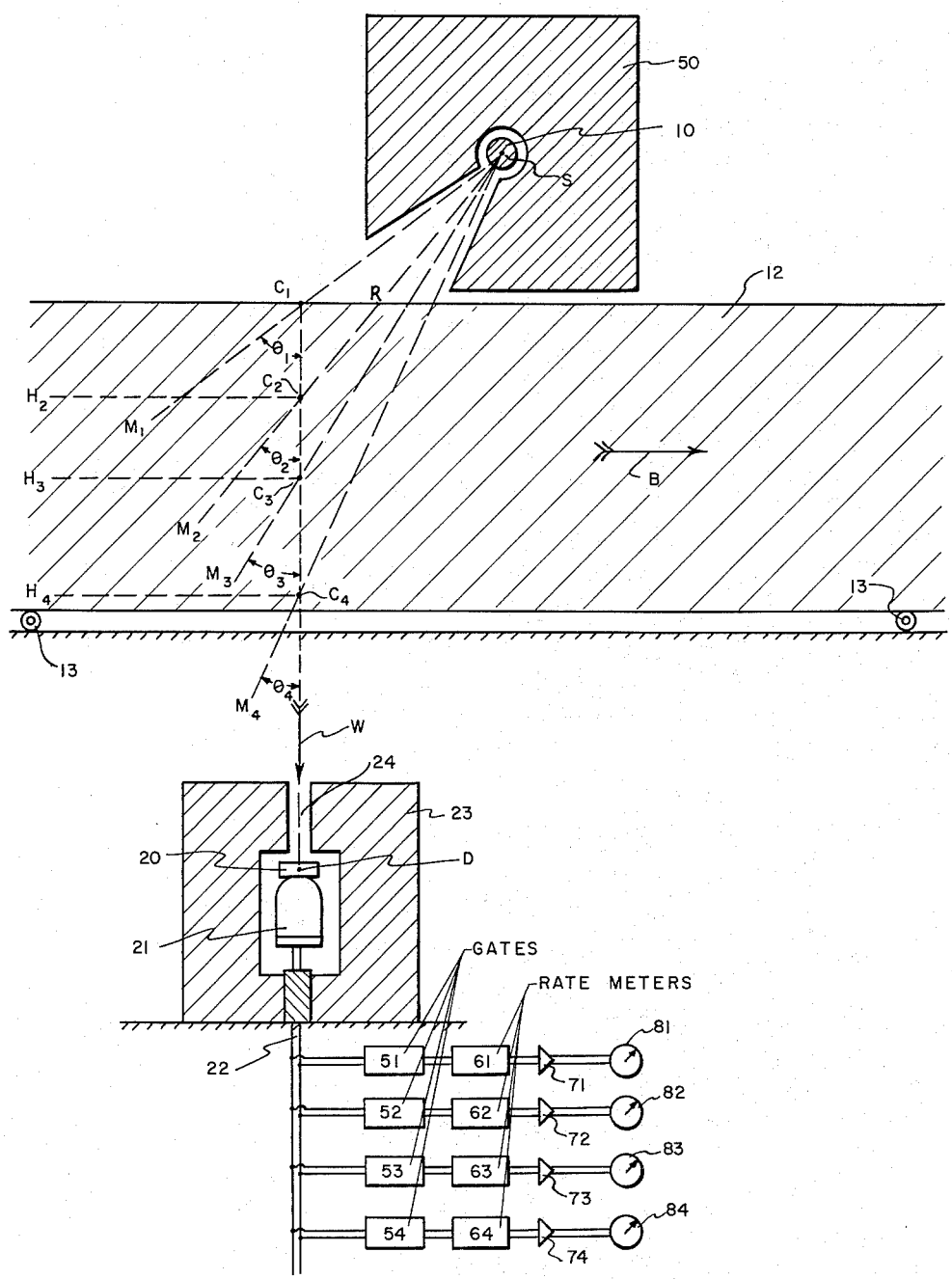

Consider now the arrangement shown in FIG. 3 representing another embodiment of my invention. Numeral 10 at the point S designates a radiation source such as $Co^{60}$ emitting gamma rays of energy 1.2 mev. This source is placed in a block 10 which strongly absorbs all radiations emitted by the source, except the radiations directed within a cone, said cone comprising all directions from $SM_1$ to $SM_4$. The radiations thus transmitted penetrate an elongated metal strip 12 which it is desired to test as said strip glides on the rolls 13 in the direction of the arrow B. As the beam traverses the strip it undergoes numerous Compton scatterings. A portion of the scattered photons directed downwards in the direction of the arrow W interacts with the crystal 20 and produces across the output terminals 22 of the photomultiplier 21 a succession of pulses having magnitudes representing the energies of said photons. The crystal 20 (located at the point D) and photomultiplier 21 are surrounded by a shield 23 which allows only a narrow beam of photons directed along the arrow W to arrive at the crystal 20.

The output leads 22 of the photomultiplier 21 are connected to gates 51, 52, 53, 54, each of said gates being arranged to pass a different characteristic amplitude, and being adapted to selectively transmit a very narrow range comprising said characteristic amplitude. The outputs of the gates 51 to 54 are connected to the rate meters 71 to 74, respectively, said rate meter being in turn connected to the indictors 81 to 84, respectively.

The beam of photons arriving at the crystal 20 along the direction W comprises photons of various energies. Each of said photons is a secondary photon that resulted from Compton scattering in which the primary photon emitted by the source 10 collided with an electron position somewhere on the line $C_1C_4$. The secondary photon resulting from said collision escaped in the direction of the arrow W and interacted with the crystal 20. It can be shown that the energy of such secondary photons is uniquely related to the point on the line $C_1C_4$ at which the scattering took place, and therefore the abundance of scattered photons of a given energy can be used as an index of the electron density (or specific weight) in the neighborhood of the point at which the scattering took place.

Consider now a photon emitted by the source S in the direction $SM_1$ that underwent a Compton collision at the point $C_1$ directly underneath the surface of the slab 12 and, as a result of this collision a scattered photon was emitted in the direction $C_1D$. The energy $E\gamma$ of the primary photon is 1.2 mev., the angle of scattering $\theta=\theta_1=\sphericalangle M_1C_1D$ and therefore we obtain from the Equation 2 the energy $(E'\gamma)_1$ of the scattered photon. The gate 51 has been designed so as to selectively transmit only those impulses that represent photon energies $(E'\gamma)_1$. Consequently, the rate meter 61 produces a signal representing the rate of arrival of photons scattered itno the immediate neighborhood of the angle $\theta_1$. Referring now to the Formula 5 it is seen that this signal is proportional to the density of electrons at the point $C_1$ and the coefficient of proportionality K is expressed by the Formula 8 in which we put $d=0$. Accordingly, the amplifier 71 is adjusted so as to give an amplification equal to the value K as expressed by (8) and thus the index given by the meter 81 represents the electron density at the point $C_1$ directly underneath the surface of the slab 12. Thus as the slab 12 moves on the rollers 13 in the direction of the arrow B, the indication of the meter 81 may vary so as to represent any unhomogeneity in the density directly underneath the surface of the slab.

Consider now a photon emitted by the source 10 in the direction $SM_2$ that underwent scattering at the point $C_2$. As a result of this scattering a secondary photon directed along the trajectory $C_2D$ interacted with the crystal 20 and produced at the output terminals 22 a current impulse corresponding to the energy of said scattered photon. The energy of said scattered photon designated as $(E'\gamma)_2$ can be found from (2) by putting $E\gamma=1.2$ mev. and $\theta=\theta_2=\sphericalangle M_2C_2M_4$. The gate 52 has been so designed as to selectively transmit only those impulses that represent the energy $(E'\gamma)_2$. Thus we obtain across the output terminals of the rate meter 62 a voltage representing the rate of occurrence of photons scattered at the point $C_2$. It is well known that this voltage is proportional to the electron density at the point $C_2$ as shown by the Formula 5 and the coefficient of proportionality K is expressed by the Formula 8 in which we put $\theta_2$ in place of $\theta_1$ and we let $d=RC_2$. Accordingly, the amplifier 72 is adjusted so as to give an amplification equal to the value of K and the index given by the meter 82 represents the electron density at the point $C_2$. As the slab 12 moves in the direction of the arrow B the indication of the meter may vary and will show any variation in density along the profile represented by the line $C_2H_2$.

In a similar manner the gates 53 and 54 are adapted to transmit only those impulses that have energies resulting from scattering at angles $\theta_3=\sphericalangle M_3C_3D$ and $\theta_4=M_4C_4D$, respectively, said impulses originating at points $C_3$ and $C_4$, respectively. Consequently, the meter 83 will represent any variation in density along the profile $C_3H_3$ and the meter 84 will represent corresponding variation in density along the profie $C_4H_4$ at the lower surface of the moving slab.

In the arrangement of FIG. 3 the source 10 is located on one side of the moving slab 12 and the detector is located on the opposite of the slab. Because of the geometry, the scattering angles $M_1CD$, $M_2CD$, $M_3CD$, and $M_4CD$ are smaller than 90 degrees. It is, however, apparent that we may place both the source of radiation and the detector on the same side of the moving slab as shown in FIG. 3a in which the said scattering angles are larger than 90 degrees. The arrangement of FIG. 3a is in some instance preferable over the one shown in FIG. 3.

Figure 4:
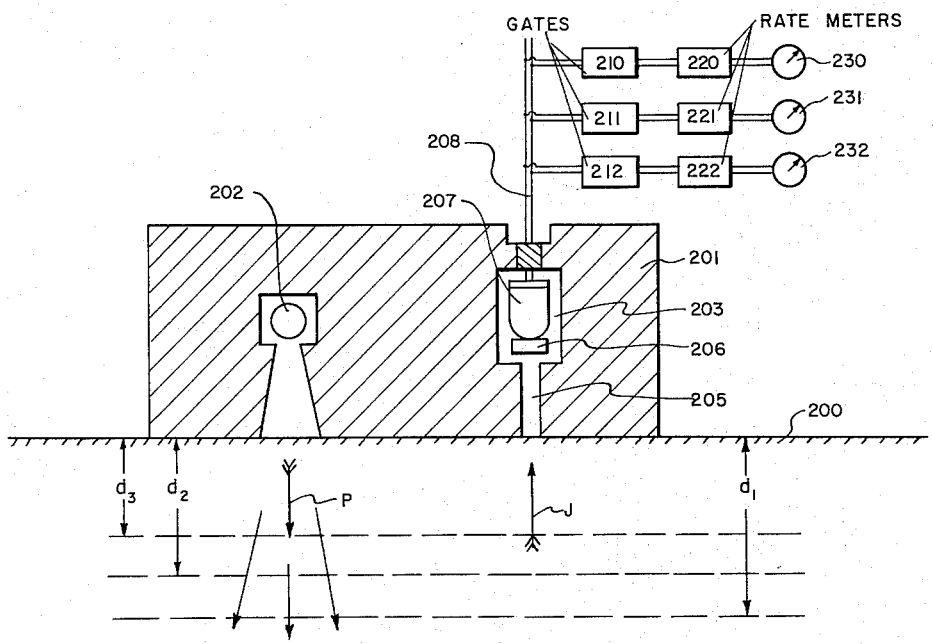
FIG. 4 shows an arrangement for measuring back scattered gamma rays in which the directional receiver is provided with several amplitude discriminators.

FIG. 4 shows another arrangement for measuring the density of a medium such as earth at various depths. The instrument is placed on the surface of the earth 200. It consists of a thick block of lead 201 within which is imbedded a source 202 of gamma rays and a detector 203 of gamma rays. The lead shield absorbs all the gamma rays emitted by the source 202 except those directed along a slightly divergent beam downwards in the direction of the arrow P. Furthermore, the shield absorbs all the gamma rays scattered by the earth below the surface 200 except those gamma rays that are scattered upwards along the narrow elongated channel 205 and interact with the sodium iodide crystal 206.

Assume as an example that the source 202 emits photons of three widely separated groups having energies $E_1$, $E_2$, and $E_3$ such that $E_1>E_2>E_3$. For instance, the source 202 may be $Sb^{124}$ and in such case $E_1=2.06$ mev.; $E_2=1.7$ mev.; and $E_3=0.65$. Instead of $Sb^{124}$ we could use for the source 202, $Cs^{134}$ and in such case $E_1=1.35$ mev., $E_2=0.79$ mev., and $E_3=0.6$ mev. Since more energetic gamma rays penetrate farther into the subsoil we designate as $d_1$, $d_2$, and $d_3$, average distances of penetration of said group respectively where $d_1>d_2>d_3$. These photons emitted downwardly in the direction of the arrow P are scattered back by the subsurface and the back scattered radiations arrive at the crystal 206 along the direction of the arrow J. As a result of backscattering the energy of the photons of energy $E_1$ are degraded to a value $E_1'$. The value $E_1'$ can be obtained from (2) by putting $E\gamma = E_1$ and $\theta = 180°$. Similarly, the photons having energies $E_2$ and $E_3$ produce backscattered photons having degraded energies $E_2'$ and $E_3'$. These degraded photons are completely absorbed by the crystal 206 and produce across the output terminals 208 of the photomultiplier 207 current impulses having magnitudes that are proportional to the energies of the corresponding photons. These impulses are subsequently transmitted through the gates 210, 211, and 212. The gate 210 is adapted to selectively transmit only those impulses that correspond to the energies $E_1'$ and the gates 211 and 212 are adapted to selectively transmit only those impulses that correspond to the energies $E_2'$ and $E_3'$, respectively. The output of the gate 210 is applied to a rate metering network 220 which produces a D.C. voltage indicated on meter 230 and representing the rate of occurrence of backscattered photons having energy $E_1'$. We can assume that the Compton collisions that produced these backscattered photons occurred at the depth $d_1$ and therefore the indication of the meter 230 represents the density of the subsurface at said depth.

Similarly, the output of the gate 211 is applied to the rate metering network 221 which produces a D.C. voltage representing the rate of occurrence of backscattered photons having energy $E_2'$. Here the Compton scattering occurred on the average at $d_2$ and therefore the indication of the meter 231 represents the density of the subsurface at said depth.

In a similar manner, it can be shown that the indication of the meter 232 represents the density of the subsurface at the depth $d_3$.

FIG. 5 shows another embodiment of my invention which is not based on Compton interaction but on the production of electron-positron pairs. The elements that are common to FIG. 1 and FIG. 6 are designated in both figures by the same numeral. The source 10 located at S transmits a collimated beam of gamma rays in the direction SM towards the slab 12 moving in the direction of the arrow B. We may use for the source S radium or any other source emitting gamma rays having energies above 1 mev. Some of these gamma rays collide with the nuclei of the substance in the slab 12 and produce electron-positron pairs. The positron emitted as a result of such a process has a very short life since it combines with an electron producing two photons, each having the energy of about 0.5 mev., said photons being emitted in opposite directions. Thus as a result of pair formation at the point C we obtain two photons that may be emitted in the directions $CD_1$ and $CD_2$, respectively. These photons are intercepted by the crystals 20a and 20b, respectively. We thus obtain at the outputs of the photomultipliers 21a, 21b two coincident pulses, each of said pulses having magnitudes corresponding to the energy of 0.5 mev. These pulses are selectively transmitted through the gates 30a and 30b, respectively, each of said gates being adapted to transmit only those pulses that correspond to photons of energy substantially equal to 0.5 mev. The outputs of the gates 30a, 30b are applied to a coincidence network 260. The output of the coincidence network is applied to the rate meter 262 and an indicator 263 is connected to the output of the rate meter.

It is apparent that each output impulse that appears across the output terminals 261 of the coincidence network 260 represents the occurrence of two simultaneous photons having energies equal to about 0.5 mev. and emitted in the direction $CD_1$ and $CD_2$, respectively. Thus each output impulse of the coincidence network is coincident with the pair formation at the point C. Furthermore, the output of the rate meter 262 shown on the meter 263 indicates the frequency of occurrence of pair formation at the point C. On the other hand, it is well known that the frequency of occurrence of pair formation is proportional to the square of the atomic number of each atom and to the number of atoms per cm.$^3$ at the point C. Thus as the slab 12 moves in the direction of the arrow B the meter 263 indicates successively the character of the substance contained at various points along the profile C—C'—C''—C'''.

I claim:

1. The method of determining the character of a relatively small localized zone in an extensive unknown medium which comprises irradiating said zone with gamma-ray photons of known energy characteristics derived from a localized radiation source outside said medium, receiving photons scattered by said medium at a second localized zone spaced away from said radiation source, and selectively measuring the rate of occurrence of received photons having energy of approximately $E_2$, where $E_2$ is equal to $$\frac{E_1}{1+\frac{E_1}{mc^2}(1-\cos\theta)}$$

$E_1$ being the energy value in mev. of the highest-energy significant component of said irradiating photons, $mc^2$ being 0.511 mev., and $\theta$ being the angle having said first zone as its apex and defined by the relative locations of said first zone, said source, and said receiving zone.

2. The method of determining the character of a relatively small localized zone in an extensive unknown medium which comprises irradiating said zone with substantially monoenergetic gamma-ray photons derived from a localized radiation source outside said medium, receiving photons scattered by said medium at a second localized zone spaced away from said radiation source, and selectively measuring the rate of occurrence of received photons having energy of approximately $E_2$, where $E_2$ is equal to $$\frac{E_1}{1+\frac{E_1}{mc^2}(1-\cos\theta)}$$

$E_1$ being the energy value in mev. of said irradiating photons, $mc^2$ being 0.511 mev., and $\theta$ being the angle having said first zone as its apex and defined by the relative locations of said first zone, said source, and said receiving zone.

3. The method of determining the character of a relatively small localized zone within an extensive unknown medium which comprises transmitting into said medium in the direction of said zone a collimated beam of gamma-ray photons having energy in mev. in $E_1$, receiving at a second localized zone spaced away from said source photons scattered by said medium, and selectively measuring the rate of occurrence of received photons having energy approximately equal to $E_2$, where $E_2$ is equal to $$\frac{E_1}{1+\frac{E_1}{mc^2}(1-\cos\theta)}$$

$mc^2$ being equal to 0.511 mev. and $\theta$ being the angle having said first zone as its apex and being defined by the relative locations of said first zone, said source, and said receiving zone.

4. The method of determining the character of a localized small zone in an extensive medium which comprises irradiating said zone with gamma-ray photons having energy in mev. of $E_1$ and derived from a source spaced away from said zone, said source being dimensionally small in comparison to the size of said medium, directionally receiving at a second localized zone spaced away from said source photons scattered from said zone, said directional reception being along the axis joining said receiving zone and said first zone, selectively measuring the rate of occurrence of those received photons having energy approximately equal to $E_2$, where $E_2$ is equal to $$\frac{E_1}{1+\frac{E_1}{mc^2}(1-\cos\theta)}$$

$mc^2$ being 0.511 mev., and $\theta$ being the angle defined by the intersection of said receiving axis and the straight line between said radiation source and said first zone.

5. The method of determining a physical characteristic of a small localized zone in an extensive unknown medium comprising transmitting from a localized radiation source into said medium in the direction of said zone a collimated beam of gamma-ray photons having energy in mev. of $E_1$, directionally receiving photons scattered by said zone at a localized receiving zone spaced away from said source, said directional reception being along an axis passing through said first zone and intersecting with said beam, and selectively measuring the rate of occurrence of said received photons having energy in the neighborhood of $E_2$, $E_2$ being equal to $$\frac{E_1}{1+\frac{E_1}{mc^2}(1-\cos\theta)}$$

$mc^2$ being 0.511 mev., and $\theta$ being the angle having said first zone as its apex and being defined by the intersection of said direction of transmission and said direction of reception, the detected photons of energy $E_2$ being thereby limited to photons which have undergone single scattering in said first localized zone.

6. The method of determining a physical characteristic of a small localized zone in an extensive unknown medium comprising transmitting toward said zone a beam of gamma-ray photons from a localized radiation source outside said medium, said beam being characterized by a determined energy $E_1$, in mev., directionally receiving at a receiving zone spaced away from said source photons scattered from said medium, said directional reception being along the straight line between said receiving zone and said first zone, and selectively measuring the rate of occurrence of received photons having energies of approximately $E_2$, where $E_2$ equals $$\frac{E_1}{1+\frac{E_1}{mc^2}(1-\cos\theta)}$$

$mc^2$ being 0.511 mev., and $\theta$ being the angle having said first zone as its apex and being defined by the intersection of said direction of transmission and said direction of reception, the photons thus selectively measured being thereby limited to photons undergoing single scattering in said first zone.

7. The method of exploring the characteristics of an extensive unknown medium which comprises transmitting into said medium from a localized radiation source a collimated beam of monoenergetic gamma-ray photons, the cross section of said beam being small compared to the dimensions of said medium, receiving at a localized receiving zone spaced away from said source photons scattered by said medium, and selectively measuring at said receiving zone the rate of occurrence of photons having energy of a definite magnitude, and repeating said last-mentioned step for other energy magnitudes, thereby determining the scattering characteristics of said medium for various distances into said medium from said source along said direction of transmission.

References Cited in the file of this patent

UNITED STATES PATENTS

| | | |
|---|---|---|
| Re. 22,531 | Hare | Aug. 22, 1944 |
| 2,304,910 | Hare | Dec. 15, 1942 |
| 2,540,821 | Harker | Feb. 6, 1951 |
| 2,590,057 | Wiegand | Mar. 18, 1952 |
| 2,675,482 | Brunton | Apr. 13, 1954 |
| 2,702,864 | McKee | Feb. 22, 1955 |